(12) United States Patent
Lee et al.

(10) Patent No.: US 6,480,252 B1
(45) Date of Patent: Nov. 12, 2002

(54) LIQUID CRYSTAL DISPLAY HAVING UNEVEN CONVEX AND CONCAVE PORTIONS IN BOTH PIXEL AND COMMON ELECTRODES

(75) Inventors: Kyung Ha Lee, Kyoungki-do (KR); Seung Moo Rim, Kyoungki-do (KR); Do Hyun Choi, Seoul (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 154 days.

(21) Appl. No.: 09/606,713

(22) Filed: Jun. 29, 2000

(30) Foreign Application Priority Data

Jun. 29, 1999 (KR) .............................. 99-25297

(51) Int. Cl.⁷ ......................................... G02F 1/1343
(52) U.S. Cl. ...................................... 349/143; 349/160
(58) Field of Search ................................ 349/143, 139, 349/129, 160

(56) References Cited

U.S. PATENT DOCUMENTS

| | | | | |
|---|---|---|---|---|
| 5,013,141 A | * | 5/1991 | Sakata | 350/348 |
| 5,644,372 A | * | 7/1997 | Shinjo et al. | 349/139 |
| 5,666,179 A | * | 9/1997 | Koma | 349/143 |
| 5,907,380 A | * | 5/1999 | Lien | 349/141 |
| 6,292,240 B1 | * | 9/2001 | Kamiya et al. | 349/84 |

FOREIGN PATENT DOCUMENTS

| | | |
|---|---|---|
| JP | 03160421 | 7/1991 |
| JP | 05150244 | 6/1993 |
| JP | 11242217 | 9/1999 |

\* cited by examiner

*Primary Examiner*—Toan Ton
*Assistant Examiner*—Andrew Schechter
(74) *Attorney, Agent, or Firm*—Ladas & Parry

(57) ABSTRACT

Disclosed is a liquid crystal display having an improved characteristic of viewing angle by modifying a pixel electrode and a common electrode construction respectively. In a liquid crystal display, upper and lower substrates are opposed to each other and spaced from each other by a predetermined distance. A liquid crystal layer is interposed between the upper and the lower substrates. A pixel electrode is formed at a portion of an inner surface of the lower substrate corresponding to a pixel area, and the pixel electrode has an uneven surface including first convex portions and first concave portions. A common electrode is formed at a portion of an inner surface of the upper substrate corresponding to the pixel electrode, so as to form an electric field together with the pixel electrode. The common electrode has an uneven surface including second convex portions and second concave portions.

1 Claim, 2 Drawing Sheets

LIQUID CRYSTAL DISPLAY HAVING UNEVEN CONVEX AND CONCAVE PORTIONS IN BOTH PIXEL AND COMMON ELECTRODES

BACKGROUND OF THE INVENTION

1. Field of the Invention

The present invention relates to a liquid crystal display, and more particularly to a liquid crystal display having an improved characteristic of viewing angle by modifying a pixel electrode and a common electrode construction respectively.

2. Description of the Related Art

A liquid crystal display is very popular in recent times as a display device in a personal appliance of office automation, a television set etc., since the liquid crystal display is thin and light, and consumes relatively low electric power. The liquid crystal display mainly employs a twist nematic(TN) mode or a super twist nematic(STN) mode for its operation mode.

In the TN mode or the STN mode, the liquid crystal molecules are arranged in such a manner that their longer axes are disposed horizontally with respect to a surface of a substrate while having a twist of ninety degrees when the electric field is not applied. On the contrary, when the electric field is applied, the liquid crystal molecules are arranged in such a manner that their longer axes are disposed vertically with respect to the surface of the substrate and in parallel with the direction of the electric field. In other words, the light is transmitted through and intercepted by such arrangements as described above in the liquid crystal display.

Hereinafter, a conventional liquid crystal display will be described with reference to FIG. 1.

Referring to FIG. 1, a lower substrate 1 and an upper substrate 11 are spaced apart from each other by a predetermined distance. A liquid crystal layer 30 including a plurality of liquid crystal molecules(not shown) is interposed between the lower substrate 1 and the upper substrate 11.

A thin film transistor 10 of the reversed staggered type and a pixel electrode 7 consisting of a transparent conductor such as an indium tin oxide(ITO) are formed on the inner surface of the lower substrate 1. The thin film transistor 10 is a switching device for independently operating each pixel. As known in the art, the thin film transistor 10 includes a gate electrode 2, a gate dielectric film, a semiconductor layer 4, an etch stopper 5, an ohmic contact layer 6, and source/drain electrodes 8a and 8b. The source electrode 8a of the thin film transistor 10 is formed to be in contact with the pixel electrode 7. A storage electrode 2a is formed on the inner surface of the lower substrate 1 in such a manner as to overlap with the pixel electrode 7. The storage electrode 2a is formed simultaneously with the gate electrode 2, and is disposed on the same plane on which the gate electrode 2 is disposed. A passivation film 9 is formed to cover the thin film transistor 10.

A black matrix 12 is formed on the inner surface of the upper substrate 11, so that the black matrix 12 defines a unit pixel. A color filter 13 is formed on the inner surface of the upper substrate 11, so that the color filter 13 corresponds to the pixel electrode 7. A dielectric film 14 is formed on the entire inner surface of the upper substrate 11 and on the black matrix 12 and the color filter 13, so as to protect the color filter 13 and to improve evenness of the inner surface of the upper substrate 11. A common electrode 15 consisting of a transparent conductor such as an ITO film is formed on the dielectric film 14.

The conventional liquid crystal display having the construction as described above is operated as follows. When the thin film transistor 10 is turned on, a data signal is applied to the pixel electrode 7, so that an electric field E is generated between the pixel electrode 7 and the common electrode 12. Then, the liquid crystal molecules are rearranged in such a manner that their long axes are disposed in parallel with the direction of the electric field E. In result, the light is partially transmitted through and partially intercepted by the liquid crystal molecules, so that a predetermined image is displayed. In this case, the direction of the electric field E is perpendicular to the surfaces of the substrates 1 and 11.

However, in the conventional liquid crystal display employing the TN mode or the STN mode, since the transmittance changes according to the direction of viewing the screen from a viewer, the conventional liquid crystal display has an inferior characteristic of viewing angle.

That is, the liquid crystal molecules exhibit a refractive anisotropy, since they have different lengths of the longer axes and the shorter axes. Therefore, in the case where is employed the liquid crystal molecules having a positive dielectric anisotropy, the liquid crystal molecules are arranged so that their longer axes are disposed vertically to the surfaces of the substrates by the electric field. Then, the viewer can see the shorter axes of the liquid crystal molecules when he views the screen in the direction of the normal line to the surface. In the meantime, the viewer can see slanted axes of the liquid crystal molecules when he views the screen from the lateral side of the screen. Accordingly, the viewing angle changes according to the direction of viewing the screen. Additionally, leakage of light occurred at the lateral sides of the screen at which the viewer can see the slanted axes of the liquid crystal molecules. Therefore, the conventional liquid crystal display employing the TN mode or the STN mode has an inferior characteristic of the viewing angle.

SUMMARY OF THE INVENTION

Accordingly, the present invention has been made in an effort to solve the problems occurring in the related art, and it is an object of the present invention to provide a liquid crystal display having an improved viewing angle characteristic.

In order to achieve the above object, the present invention provides a liquid crystal display having: upper and lower substrates opposed to each other and spaced from each other by a predetermined distance; a liquid crystal layer interposed between the upper and the lower substrates, the liquid crystal layer including a plurality of liquid crystal molecules; a pixel electrode formed at a portion of an inner surface of the lower substrate corresponding to a pixel area, the pixel electrode having an uneven surface including first convex portions and first concave portions; and a common electrode formed at a portion of an inner surface of the upper substrate corresponding to the pixel electrode, so as to form an electric field together with the pixel electrode, the common electrode having an uneven surface including second convex portions and second concave portions.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

The above and other objects, characteristics, and advantages of the present invention will become apparent from the following description along with the accompanying drawings.

Figure 1:
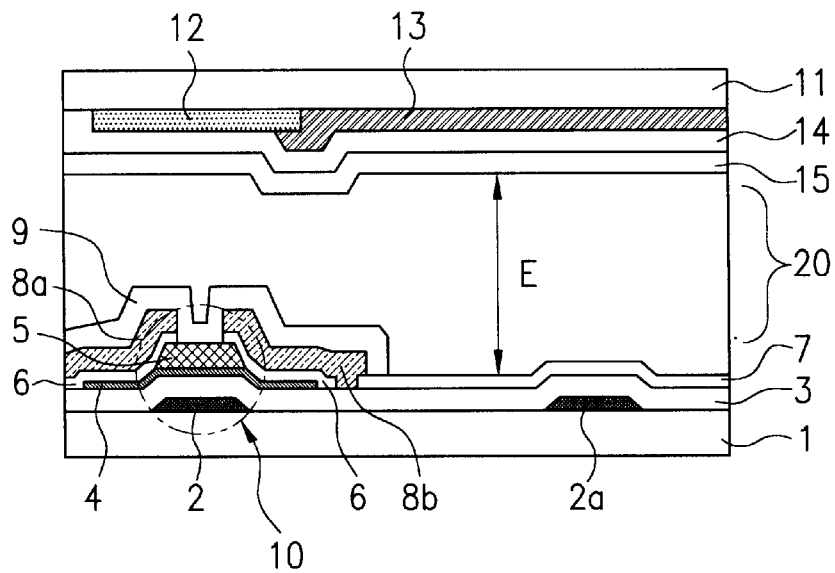
FIG. 1 is a sectional view of the conventional liquid crystal display.
Figure 2:
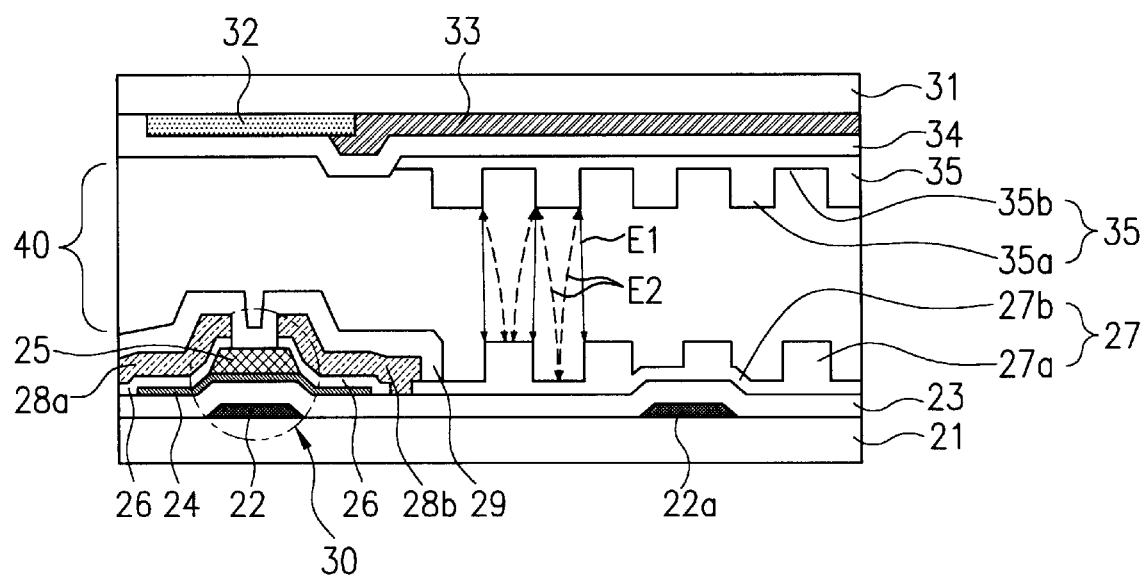
FIG. 2 is a sectional view of a liquid crystal display according to an embodiment of the present invention.

Referring to FIG. 2, a lower substrate 21 and an upper substrate 31 made of transparent insulating substrates, are spaced apart from each other with a predetermined distance. A liquid crystal layer 40 including a plurality of liquid crystal molecules is interposed between the lower substrate 21 and the upper substrate 31.

A thin film transistor 30 functioning as a switching device is disposed at a desired position on an inner surface of the lower substrate 21. The thin film transistor 30 includes a gate electrode 22, a gate dielectric film 23, a semiconductor layer 24 made of a-Si, an etch stopper 25 made of $SiN_x$, an ohmic contact layer 26 made of $n^+$a-Si, and source/drain electrodes 28a and 28b.

A passivation film 29 is formed to cover the thin film transistor 30. A storage electrode 22a is formed on the inner surface of the lower substrate 21 while being spaced from the thin film transistor 30. A pixel electrode 27 is disposed at a desired portion of the inner surface of the lower substrate, that is, at a pixel area. The pixel electrode 27 is a transparent conductor such as an ITO film, and has an uneven surface including convex portions 27a and concave portions 27b.

A black matrix 32 and a color filter 33 are disposed at desired portions of an inner surface of the upper substrate 31. That is, the black matrix 32 is disposed on the upper substrate 31 in such a manner as to correspond to the thin film transistor 30, and the color filter 33 is disposed on the upper substrate 31 in such a manner as to correspond to the color filter 33. A dielectric film 34 is formed on the entire inner surface of the upper substrate 31 that the black matrix 32 and the color filter 33 is formed, so as to protect the color filter 33 and to improve evenness of the inner surface of the upper substrate 31.

A common electrode 35 is formed on the dielectric film 34. The common electrode 35 is a transparent conductor such as an ITO film and has an uneven surface including convex portions 35a and concave portions 35b, as the pixel electrode 27 has. In this case, the liquid crystal display has an arrangement in which the convex portions 35a of the common electrode 35 correspond to the concave portions 27b of the pixel electrode 27, while the concave portions 35b of the common electrode 35 correspond to the convex portions 27a of the pixel electrode 27.

Figure 4:
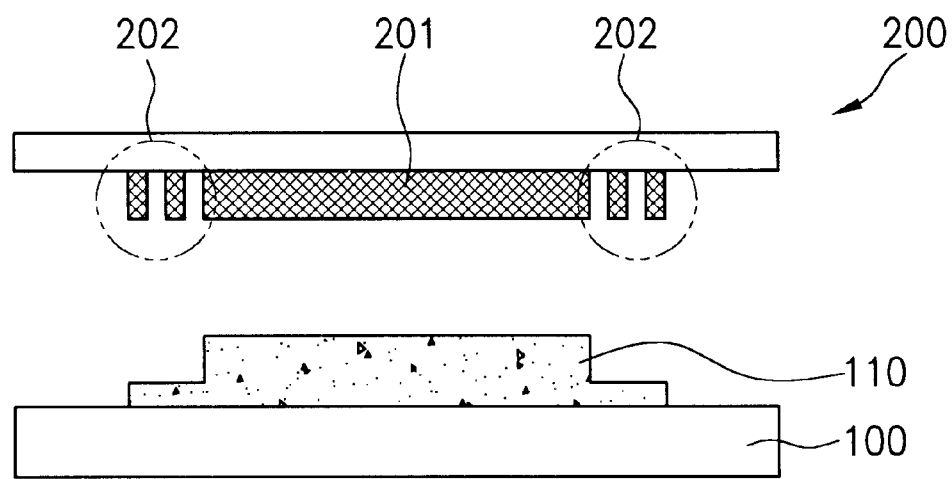
FIG. 4 is a sectional view of the pixel electrode and the common electrode employed in the liquid crystal display shown in FIG. 2.

Hereinafter, described will be a method for forming the pixel electrode 27 and the common electrode 35 respectively having an uneven surface, with reference to FIG. 4.

A transparent conductor 100 such as an ITO film is prepared, and a photoresist is coated on the transparent conductor 100. A photomask 200 is disposed above the photoresist, and the photoresist is exposed through the photomask 200. Herein, the photomask 200 have light shielding patterns 201 that are disposed above the portions of the transparent conductor which are to be the convex portions and fine light shielding patterns 202 having a line width and space smaller than a limit value of exposure that are disposed above the portions of the transparent conductor which are to be the concave portions.

A photoresist pattern 110 is obtained by developing the exposed photoresist. In this case, the photoresist pattern 110 has partially different thicknesses, because the intensity of the light transmitted through the fine light shielding patterns 202 are smaller than the intensity of the light transmitted through the region without the patterns 201 and 202. The portion of the photoresist exposed to the light transmitted through the fine light shielding patterns 202 is not entirely exposed to light, but partially exposed.

The pixel electrode and the common electrode having uneven surfaces including convex and concave portions are formed by etching the transparent conductor 100 by means of the photoresist pattern 110, though not shown.

In the liquid crystal display of the present invention, the cell gaps between the electrodes 27 and 35 are different, since the pixel electrode 27 and the common electrode 35 respectively have convex portions 27a and 35a and concave portions 27b and 35b. For example, in the case where the convex portions 27a and 35a of the electrodes 27 and 35 have the same height, there exist two areas whose cell gaps are different from each other in a unit pixel space. Meanwhile, in the case where the convex portions 27a and 35a of the electrodes 27 and 35 have different heights, there exist at least three areas of cell gaps in a unit pixel space.

In this case, since the electric field is inverse proportional to the length of the cell gap, the liquid crystal display of the present invention has the shortest cell gap, that is, the strongest electric field E1 between the adjacent ends of the portions 27a and 35a. Therefore, the electric field E2 formed the longest cell gaps, that is, between the concave portions 27b and 35b is deflected toward the strongest electric field E1 by the effect of the strongest electric field E1.

In detail, as shown in FIG. 2, the electric field E2 formed between the entire portions of the pixel electrode or the common electrode 35 and the corresponding convex portions 27a and 35a of the pixel electrode 27 or the common electrode 35 is deflected by the influence of the strongest electric field E1 formed between the convex portions 27a and 35a. In this case, since the convex portions 27a and 35a are formed with regular intervals, the electric field E2 is symmetric.

Accordingly, the anisotropy of refraction index of the liquid crystal molecules is compensated by the symmetric arrangement of the liquid crystal molecules along the direction of the electric field E2, thereby achieving a characteristic of a symmetric viewing angle. This means that the liquid crystal display of the present invention has an improved characteristic of a viewing angle.

Figure 3:
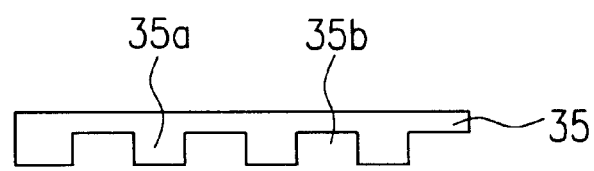
FIG. 3 is a schematic sectional view of a pixel electrode and a common electrode according to another embodiment of the present invention.
Figure 3:
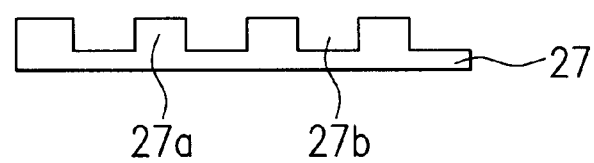

In the meantime, as shown in FIG. 3 for showing another embodiment of the present invention, the pixel electrode 27 and the common electrode 35 may be arranged in such a manner that the convex portions 27a of the pixel electrode 27 are disposed to correspond to the convex portions 35a of common electrode 35 and the concave portions 27b of the pixel electrode 27 are disposed to correspond to the concave portions 35b of common electrode 35. In this case, as in the previous embodiment, since there exist differences between cell gaps, achieved is an improvement in the characteristic of the viewing angle.

Further, although the convex and the concave portions have rectangular contours shown in the accompanying drawings, they may have other kinds of contours such as a circular contour and a contour of a wedge, without being restricted by the shown embodiments.

According to the present invention, the electric field is symmetrically deflected due to the convex and the concave portions formed on the pixel electrode and the common electrode according to a regular rule. Therefore, the liquid crystal molecules are arranged symmetrically along the direction of the electric field, and then a characteristic of a symmetric viewing angle is obtained, thereby achieving an improvement in the characteristic of the viewing angle.

While there have been illustrated and described what are considered to be preferred specific embodiments of the present invention, it will be understood by those skilled in the art that the present invention is not limited to the specific embodiments thereof, and various changes and modifications and equivalents may be substituted for elements thereof without departing from the true scope of the present invention.

What is claimed is:

1. A liquid crystal display having a wide viewing angle, the liquid crystal display comprising:

upper and lower substrates opposed to each other and spaced from each other by a predetermined distance;

a liquid crystal layer interposed between the upper and the lower substrates, the liquid crystal layer including a plurality of liquid crystal molecules;

a pixel electrode formed at a portion of an inner surface of the lower substrate corresponding to a pixel area, the pixel electrode having an uneven surface including a first convex portion and a first concave portion; and a common electrode formed at a portion of an inner surface of the upper substrate corresponding to the pixel electrode, so as to form an electric field together with the pixel electrode, the common electrode having an uneven surface including second convex portions and second concave portions, wherein the first convex portions of the pixel electrode are disposed to correspond to the second concave portions of the common electrode, and the first concave portions of the pixel electrode are disposed to correspond to the second convex portions of the common electrode.

* * * * *